United States Patent
Melden et al.

[11] Patent Number: 5,909,438
[45] Date of Patent: *Jun. 1, 1999

[54] LOGICAL MULTICAST FROM A SWITCH CONFIGURED FOR SPATIAL MULTICAST

[75] Inventors: Kurt A. Melden, Westborough; Gregory S. Goss, Lowell, both of Mass.

[73] Assignee: Cascade Communications Corp., Westford, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/710,673

[22] Filed: Sep. 18, 1996

[51] Int. Cl.$^6$ ..................................................... H04L 12/56
[52] U.S. Cl. ......................... 370/388; 370/390; 370/432
[58] Field of Search ..................................... 370/351, 389, 370/390, 392, 394, 395, 396, 397, 398, 399, 400, 412, 417, 418, 422, 423, 424, 432, 386, 387, 388

[56] References Cited

U.S. PATENT DOCUMENTS

| | | | |
|---|---|---|---|
| 5,179,556 | 1/1993 | Turner | 370/233 |
| 5,202,885 | 4/1993 | Schrodi et al. | 370/355 |
| 5,229,991 | 7/1993 | Turner | 370/389 |
| 5,305,311 | 4/1994 | Lyles | 370/397 |
| 5,402,415 | 3/1995 | Turner | 370/390 |
| 5,410,540 | 4/1995 | Aiki et al. | 370/390 |
| 5,434,855 | 7/1995 | Perlman et al. | 370/394 |
| 5,436,893 | 7/1995 | Barnett | 370/392 |
| 5,497,369 | 3/1996 | Wainwright | 370/390 |
| 5,592,476 | 1/1997 | Calamvokis et al. | 370/390 |

*Primary Examiner*—Chi H. Pham
*Assistant Examiner*—Kwang B. Yao
*Attorney, Agent, or Firm*—Weingarten, Schurgin, Gagnebin & Hayes LLP

[57] ABSTRACT

A method and apparatus are disclosed for multicasting through a single physical port in a switch, i.e., logical multicasting. An incoming cell is logically multicast by providing a first copy of the cell to the desired output port and providing a second copy of the cell to a loop-back element which includes standard input and output ports dedicated to loop-back operation. The cell provided to the loop-back element is subsequently provided to the desired output port such that the first and second copies of the cell are serially transmitted from the single desired output port. Further, the cell provided to the loop-back element may be repeatedly copied, provided to the loop-back element, and provided to the desired output port. Thus, the incoming cell may be transmitted through a single output port as many times as is desired. When utilized in conjunction with a switch configured for unicast operation, multicast type capability can be provided in the unicasting switch by logically multicasting from the multicasting switch to the unicasting switch.

13 Claims, 2 Drawing Sheets

LOGICAL MULTICAST FROM A SWITCH CONFIGURED FOR SPATIAL MULTICAST

FIELD OF THE INVENTION

This invention relates to telecommunications, and more particularly to multicasting in a switch.

BACKGROUND OF THE INVENTION

Telecommunications networks deliver data by routing data units, such as Asynchronous Transfer Mode ("ATM") cells, from source to destination through switches. Each switch includes input/output ("I/O") ports through which the ATM cells are received and transmitted. The switch determines the appropriate port for output transmission of the cell based on the cell header, which contains destination indicating information.

Depending on the destination indicated in the cell header, it may be desirable to transmit the cell from multiple ports on the switch. Cells which enter a switch through one port and exit through one port are referred to as unicast cells. Cells which enter the switch through a single port and exit through multiple ports are known as multicast cells. While most existing switches are configured to handle unicast cells, not all switches are capable of multicast operation. Further, while most if not all multicast switches are capable of "spatial" multicast operation (transmission of single copies of a cell through multiple output ports), not all multicast switches are capable of "logical" multicast operation (transmission of multiple copies of a cell through a single output port), Logical multicast switches are known, but are more complex and costly than typical spatial-only multicast switches. Accordingly, it would be desirable to be able to handle logical multicast operation without significantly adding to the cost or complexity of the switch. Additionally, it would be useful to provide multicast type capability in switches which do not support multicast operation by design.

SUMMARY OF THE INVENTION

A method and apparatus for multicasting a cell through a single physical port in a switch is disclosed. Multicasting through a single physical port, i.e., logical multicasting, is accomplished by providing a first copy of an incoming cell to a desired output port as determined from the cell header and providing a second copy of the cell to a loop-back element. The cell provided to the loop-back element is provided to the desired output port and transmitted therefrom such that the first and second copies of the cell are serially transmitted from the single desired output port. By repeatedly copying the cell, providing a copy of the cell to the loop-back element, and providing a copy of the cell to the desired port, the incoming multicast cell may be logically multicast through the desired output port as many times as is desired. The loop-back element may comprise an input port and output port pair, i.e, an I/O port. The input and output ports of the loop-back element may be specifically dedicated to execute the loop-back function, or may be a normally functional input and output ports on the switch, temporarily configured for loop-back operation.

By providing logical multicast capability in a switch configured for spatial multicast operation, multicast type capability can be provided in switches which are not configured for spatial multicast operation. As a result of network architecture, the most direct route from an upstream multicasting switch to a downstream unicasting switch will be through a particular output port on the multicasting switch and a particular input port on the unicasting switch. If it is desired to multicast a cell from the unicasting switch, the cell is first logically multicast in the upstream multicasting switch to provide a plurality of cells which are transmitted through the appropriate output port to the downstream unicasting switch. As the logically multicast cells are received in the unicasting switch, the cells are serially broadcast, i.e., unicast, to various selected output ports on the unicasting switch in a manner which approximates multicast operation

BRIEF DESCRIPTION OF THE DRAWINGS

The invention will be more fully understood in reference to the following detailed description of the drawings, in which.

DETAILED DESCRIPTION

Figure 1:
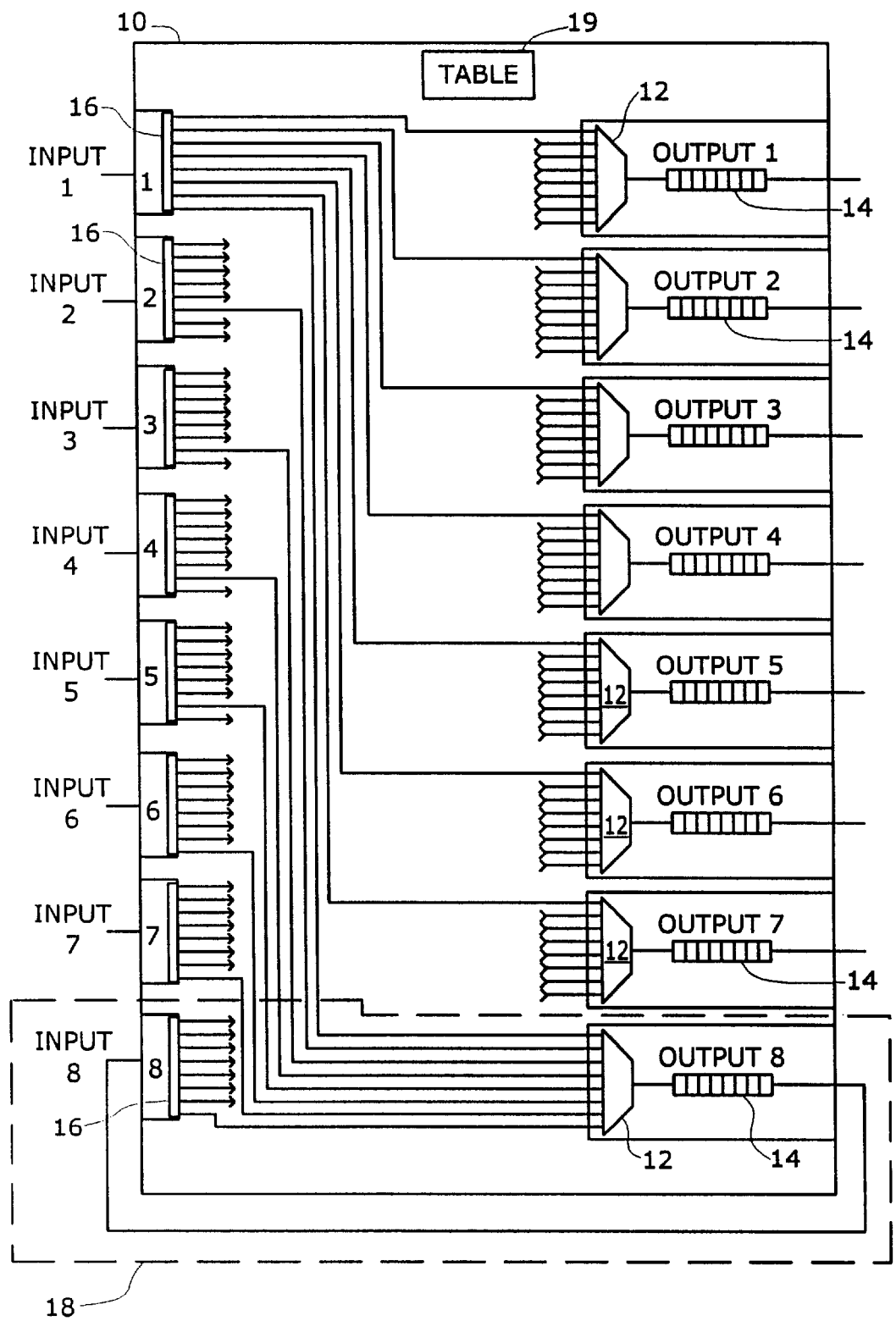
FIG. 1 is a block diagram of a switch which is capable of multicast operation.

FIG. 1 illustrates a switch 10 capable of multicasting cells through a single port, i.e., logical multicasting. The switch 10 includes eight I/O ports which, for purposes of explanation, are illustrated as eight input ports and eight output ports. Each output port includes a multiplexing element 12 and a FIFO buffer 14. Each input port includes a duplicating element 16.

Overspeeding is employed within the switch to accommodate switch traffic demands. Each output port is configured to accept cells from any one of the input ports. That is, each output port is connected to all input ports through the multiplexing elements 12 (only exemplary connections from input port 1 and to output port 8 are shown). FIFO buffers 14 are therefore employed in each output port to prevent cell loss in the output ports when cells are simultaneously transmitted from a plurality of input ports to a single output port.

In spatial multicast operation incoming multicast cells are selectively duplicated in the duplicating element 16 and transmitted therefrom to appropriate output ports based upon information in the respective cell headers and management tables 19 maintained within the switch. The cells are then directed to the output ports through the multiplexing elements 12 and are provided to the FIFO 14, from which the cells are transmitted from the switch 10.

In order to provide logical multicasting, at least one input and output port pair is dedicated to loop-back operation. In the exemplary embodiment described herein the loop-back element 18 includes input port 8 and output port 8, which are dedicated to loop-back operation. The loop-back element 18, upon receipt of a cell at output port 8, transmits the received cell from output port 8 to input port 8, where multiple copies of the cell can be made. The input port 8 then transmits the cell from the input port 8 to at least one output port on the switch. The input and output ports of loop-back element 18 may be specifically dedicated to execute the loop-back function, or may be a normally functional input and output ports on the switch, temporarily configured for loop-back operation.

Figure 3:
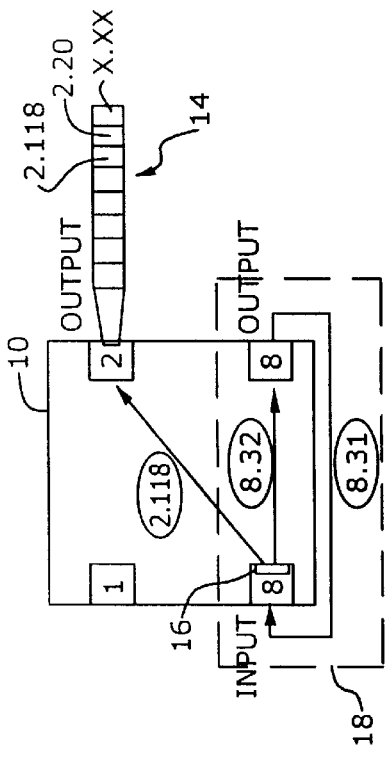
FIGS. 2–4 illustrate a method of multicasting to a single port in the switch of FIG. 1.
Figure 2:
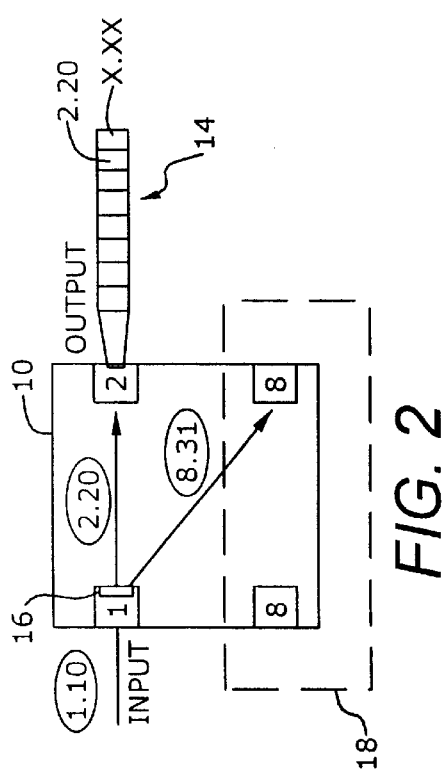
Figure 4:
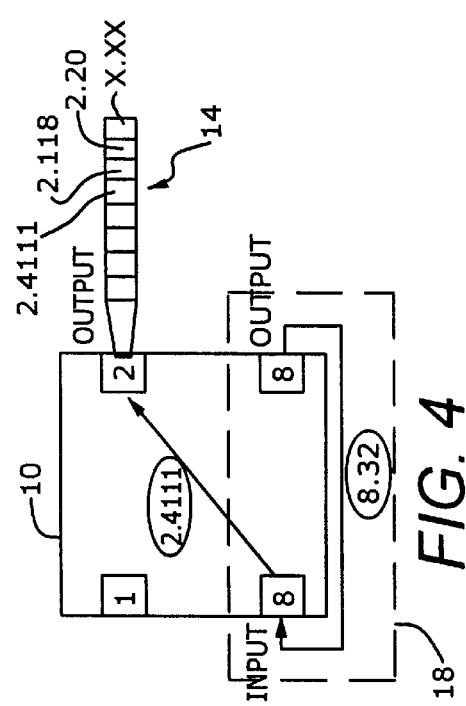

FIGS. 2–4 illustrate logical multicasting with the switch of FIG. 1. Referring now to FIG. 2, a single incoming multicast cell 1.10 is provided to input port 1 of the switch 10. The cell identification "1.10" indicates that the cell destination is port "1," connection "10," where "10" corresponds to an arbitrary connection number assignment within the switch. The multicast cell 1.0 is duplicated in the input port 1 duplicating element 16 to provide cell copy 2.20 and cell copy 8.31. Destination indicating information in the headers of cell 2.20 and cell 8.31 is updated to indicate new cell destinations: output port 2 and the loop-back element 18 output, respectively. The cells are then routed to output ports by the switch. Cell 2.20 is provided to output port 2, and cell 8.31 is provided to the dedicated loop-back element 18.

Referring now to FIG. 3, cell 8.31 is provided to the loop-back element input from the loop-back element output. At the loop-back element input cell 8.31 is duplicated and the respective destination indicating information in each cell header is updated, providing cell 2.118 and cell 8.32. Cell 8.32 is provided to the loop-back element output and cell 2.118 is provided to output port 2. In output port 2, cell 2.118 is queued into the FIFO 14 behind cell 2.20.

Referring now to FIG. 4, cell 8.32 is provided to the loop-back element input from the loop-back element output. Destination indicating information in the header of cell 8.32 is updated at the loop-back element input and resulting cell copy 2.4111 is provided to output port 2, where cell 2.4111 is queued behind cells 2.20 and 2.118 respectively in the FIFO 14. It will be appreciated that a the number of cells which are broadcast from output port 2 can be extended by continuing to provide cells to the loop-back output port and the desired output port (output port 2 in the present example), transmitting cells from the loop-back element output to the loop-back element input, duplicating the looped-back cell, providing a first copy of the cell to the desired output port and providing a second copy of the cell to the loop-back element output.

Figure 5:
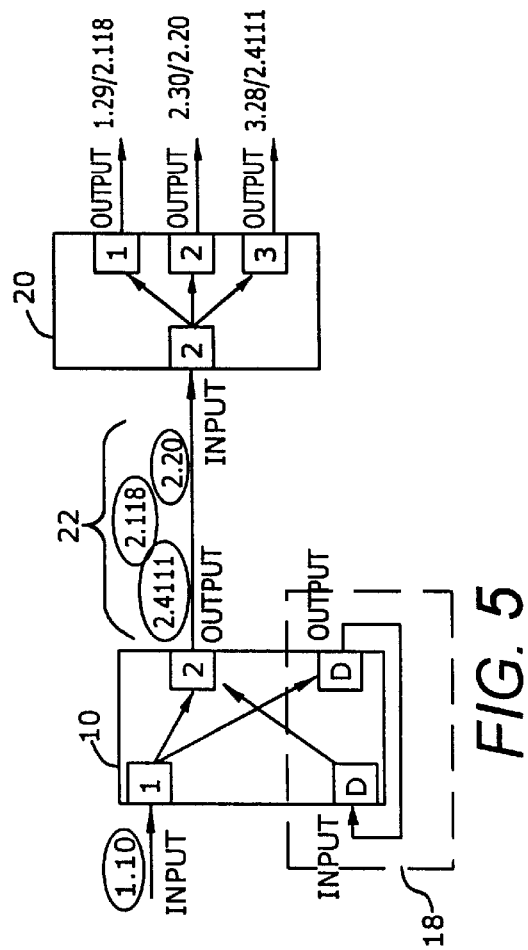
FIG. 5 illustrates multicasting from a switch configured for unicast operation in a telecommunications network.

FIG. 5 illustrates multicasting from a switch 20 configured for unicast-only operation (a "unicast switch") by using the multicast switch 10 of FIG. 1. The switch 20 is a unicast switch and thus cannot direct an incoming cell to more than one output port thereon. To provide multicast type capability in this architecture the incoming multicast cell 1.10 is logically multicast from an output port, e.g., output port 2, in the nearest upstream multicast capable switch 10 in the manner described above with reference to FIGS. 1–4. The multicast switch 10 thus provides a serial stream 22 of multicast cells 2.20, 2.118, 2.4111 from the single inputted multicast cell 1.10. As the serial stream of multicast cells enter the unicasting switch 20, the destination indicating information in each cell header is updated, and the cells are forwarded to the appropriate output ports on the unicasting switch as determined from the destination indicating information. More particularly, the cells are individually broadcast from the unicasting switch 20. For example, cell 2.20 is updated and broadcast from output port 2 of the unicasting switch 20 as cell 2.30. Similarly, cell 2.118 is updated and broadcast from output port 1 of the unicasting switch as cell 1.29. The result is a multicast type broadcast of the multicast cell 1.10 from multiple ports of the unicasting switch 20. Unlike true multicast operation, however, in multicast type broadcast the cell copies are serially broadcast rather than simultaneously broadcast.

It will be understood that various changes and modifications to the above described method and apparatus may be made without departing from the inventive concepts disclosed herein. Accordingly, the present invention is not to be viewed as limited except by the spirit and scope of the appended claims.

What is claimed is:

1. A method or logically multicasting a plurality of copies of a data unit from a first switch to a second switch, said first and second switches each having a plurality of input ports and a plurality of output ports, wherein each of the input and output ports has an input and an output and at least one of said output ports of said first switch is coupled to at least one of said input ports of said second switch via a communications link, comprising the steps of:

receiving a data unit at the input of a first one of said plurality of input ports of said first switch;

in a first directing step, directing a first copy of the received data unit to the input of a first one of said plurality of output ports of said first switch and transmitting said received data unit from the output of said first one of said plurality of output ports of said first switch to the second switch over the communications link;

in a second directing step, directing a second copy of the received data unit to the input of a second one of said plurality of output ports of said first switch;

in a third directing step, directing said second copy of the received data unit to the input of a second one of said plurality of input ports of said first switch from the output of said second one of said plurality of output ports of said first switch;

in a fourth directing step, directing the second copy of the received data unit from the output of the second one of said plurality of input ports of the first switch to the input of the first one of said plurality of output ports of the first switch; and transmitting said second copy of said received data unit from the output of the first one of said plurality of output ports of the first switch to the second switch over the communication link following the transmission of said first copy of said received data unit to the second switch over the communication link.

2. The method of claim 1 further including the step of duplicating the received data unit in the first input port to provide the first and second copies of the received data unit.

3. The method of claim 2 further including the step of buffering each of the copies of the received data units directed to the first one of said plurality of output ports in a first-in, first-out ("FIFO") memory prior to transmitting such copies from the output of the first one of said plurality of output ports.

4. The method of claim 3 further including the step of duplicating the second copy of the received data unit in the second one of said plurality of input ports following said third directing step to provide a third copy of the data unit.

5. The method of claim 4 further including the step of providing the third copy of the received data unit to the input of the first one of said plurality of output ports from the output of the second one of said plurality of input ports.

6. A method of providing spatial multicast like operation in a telecommunications network having a upstream switch and a downstream switch wherein each of said upstream switch and said downstream switch has a plurality of input ports and a plurality of output ports and wherein the downstream switch does not possess multicast capability, comprising the steps of:

identifying a multicast data unit to be broadcast from at least two of said plurality of output ports in the downstream switch;

logically multicasting said multicast data unit from the upstream switch by serially transmitting a plurality of copies of the multicast data unit from one of said plurality of output ports of said upstream switch to one of said plurality of input ports of said downstream switch;

receiving the serially transmitted plurality of data unit copies in the downstream switch; and transmitting at least a first one of the received data unit copies over a first one of the respective output ports of the downstream switch and transmitting at least a second one of the received data unit copies over a second one of the respective output ports of the downstream switch.

7. The method of claim 6 wherein said multicasting step includes the step of duplicating the multicast data unit to provide first and second copies thereof.

8. The method of claim 7 further including the step of receiving said multicast data unit at a first one of said plurality of input ports of said upstream switch, and wherein said step of logically multicasting said multicast data unit further includes the steps of:

providing the first copy to the downstream switch through a first one of said plurality of output ports of said upstream switch and looping the second copy of said multicast data unit through a second one of said plurality of output ports and through a second one of said plurality of input ports prior to transmitting said second copy of said multicast data unit to said downstream switch.

9. The method of claim 8 further including the step of queuing each of the multicast data units in the output port of the upstream switch prior to transmitting the respective data units to the downstream switch.

10. A telecommunications network architecture which approximates multicast transmission of a plurality of copies of a data unit via a single output port, comprising:

an upstream switch capable of multicast transmission of single copies of a data unit via each of a plurality of output ports, said upstream switch including a plurality of input ports, a plurality of output ports, a duplication element, and a loop-back circuit having an input and an output interconnected such that a data unit provided to said loop-back circuit output is selectably provided to said loop-back circuit input; and a downstream switch which does not possess multicast capability, said downstream switch having a plurality of input ports and a plurality of output ports, said downstream switch connected to said upstream switch through a first input port of said plurality of input ports on said downstream switch and a first output port of said plurality of output ports on said upstream switch, wherein transmission of a multicast data unit is approximated in said downstream switch by duplicating the multicast data unit in said duplication element of said upstream switch to provide first and second copies of the multicast data unit, transmitting the first copy of the multicast data unit to said first output port of said plurality of output ports on said upstream switch, transmitting the second copy of the multicast data unit to said loop-back circuit output such that the second copy of the multicast data unit is provided to said loop-back circuit input, transmitting the second copy of the multicast data unit from the loop-back input to said first output port of said plurality of output ports on said upstream switch, serially transmitting the first and second copies of the multicast data unit from said first output port of said upstream switch to said first input port of said downstream switch, receiving the serially transmitted copies of the multicast data unit in the downstream switch, and transmitting the first and second copies of the multicast data unit from different output ports in said downstream switch.

11. The telecommunications network architecture of claim 10 wherein each output port of said plurality of output ports in said upstream switch includes a multiplexing element connected to each input port of said plurality of input ports on said upstream switch and said loop-back circuit input, each said multiplexing element providing data units to the respective output port associated therewith.

12. The telecommunications network architecture of claim 11 wherein each said output port of said plurality of output ports in said upstream switch includes a first-in, first-out ("FIFO") memory connected to said multiplexing element to buffer data units provided to the respective output port associated therewith.

13. The telecommunications network architecture of claim 12 wherein said loop-back circuit of said upstream switch is a normally functional input/output port temporarily dedicated to loop-back operation.

* * * * *